(12) United States Patent
Sun et al.

(10) Patent No.: US 11,706,074 B2
(45) Date of Patent: Jul. 18, 2023

(54) CHANNEL OCCUPANCY TIME BASED RADIO LINK MEASUREMENTS AND RADIO RESOURCE MEASUREMENTS IN SHARED SPECTRUM

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 17/172,982

(22) Filed: Feb. 10, 2021

(65) Prior Publication Data

US 2021/0266214 A1    Aug. 26, 2021

Related U.S. Application Data

(60) Provisional application No. 62/981,820, filed on Feb. 26, 2020.

(51) Int. Cl.
| | |
|---|---|
| *H04W 4/00* | (2018.01) |
| *H04L 27/26* | (2006.01) |
| *H04W 56/00* | (2009.01) |
| *H04W 74/08* | (2009.01) |
| *H04W 24/10* | (2009.01) |
| *H04W 16/14* | (2009.01) |

(52) U.S. Cl.
CPC ......... *H04L 27/2656* (2013.01); *H04W 24/10* (2013.01); *H04W 56/001* (2013.01); *H04W 74/0808* (2013.01); *H04W 16/14* (2013.01)

(58) Field of Classification Search
None
See application file for complete search history.

(56) References Cited

U.S. PATENT DOCUMENTS

| | | | | |
|---|---|---|---|---|
| 2015/0280882 | A1* | 10/2015 | Lee .......................... | H04L 1/18 370/329 |
| 2017/0201967 | A1* | 7/2017 | Yang ................. | H04W 72/0446 |
| 2019/0313350 | A1* | 10/2019 | Zhang ...................... | H04B 7/12 |
| 2020/0053670 | A1* | 2/2020 | Jung ...................... | H04W 56/00 |
| 2020/0229093 | A1* | 7/2020 | Ahmad ............... | H04W 72/042 |
| 2020/0236711 | A1* | 7/2020 | Nam .................. | H04W 74/0808 |

(Continued)

*Primary Examiner* — Bob A Phunkulh
(74) *Attorney, Agent, or Firm* — ArentFox Schiff LLP

(57) ABSTRACT

A base station may transmit a control channel transmission during a configured discovery reference signal window on a shared spectrum. A user equipment (UE) may detect the control channel transmission from the base station during the configured discovery reference signal window on the shared spectrum. The UE may determine, in response to detecting the control channel transmission, expected synchronization signal block (SSB) positions within a maximum SSB burst length starting from the control channel transmission during the discovery reference signal window. The base station may transmit SSBs at the expected SSB positions within the maximum SSB burst length starting from the control channel transmission during the discovery reference signal window. The UE may measure SSBs at the expected SSB positions. The UE may conserve power by stopping measurements or entering a sleep mode after the expected SSB positions.

30 Claims, 9 Drawing Sheets

(56) References Cited

U.S. PATENT DOCUMENTS

| | | | |
|---|---|---|---|
| 2021/0112536 A1* | 4/2021 | Shah | H04W 72/042 |
| 2021/0135803 A1* | 5/2021 | Chang | H04W 74/0808 |
| 2021/0297966 A1* | 9/2021 | Noh | H04L 27/26025 |
| 2021/0307061 A1* | 9/2021 | Huang | H04W 74/0808 |
| 2021/0320821 A1* | 10/2021 | Lee | H04L 5/0053 |
| 2021/0328738 A1* | 10/2021 | Mondal | H04W 72/20 |
| 2022/0094487 A1* | 3/2022 | Mondal | H04W 72/044 |
| 2022/0104251 A1* | 3/2022 | Noh | H04W 74/08 |
| 2022/0104258 A1* | 3/2022 | Moon | H04L 5/0092 |
| 2022/0141805 A1* | 5/2022 | Tooher | H04L 5/0053 |
| | | | 370/336 |
| 2022/0210720 A1* | 6/2022 | Harada | H04L 27/2666 |

* cited by examiner

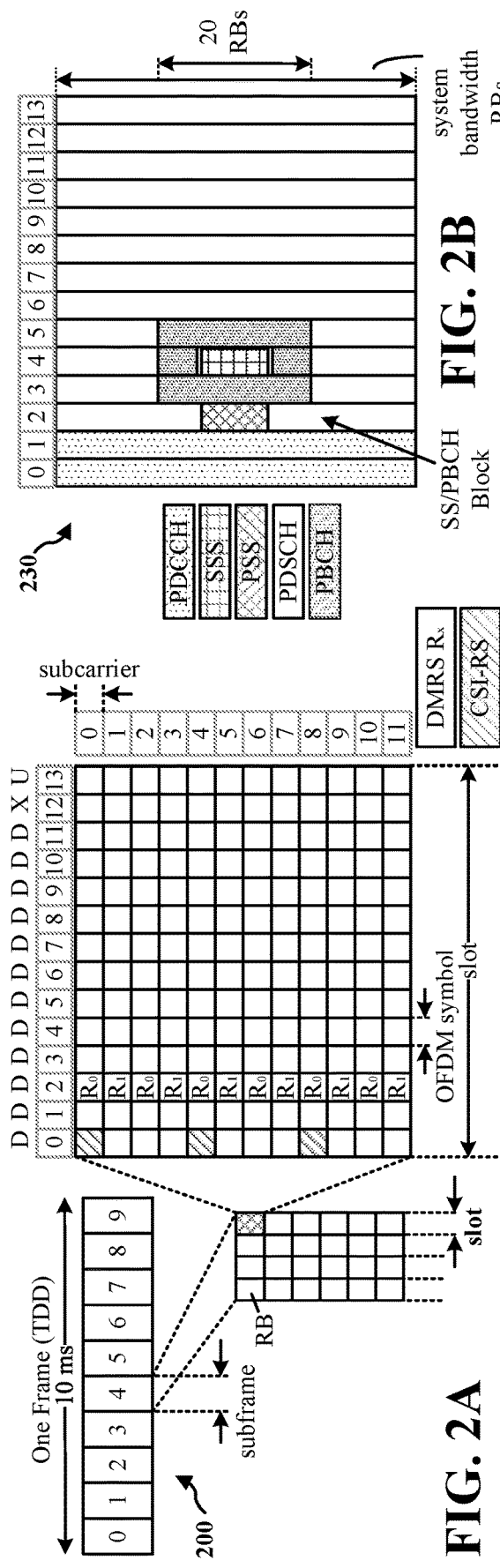
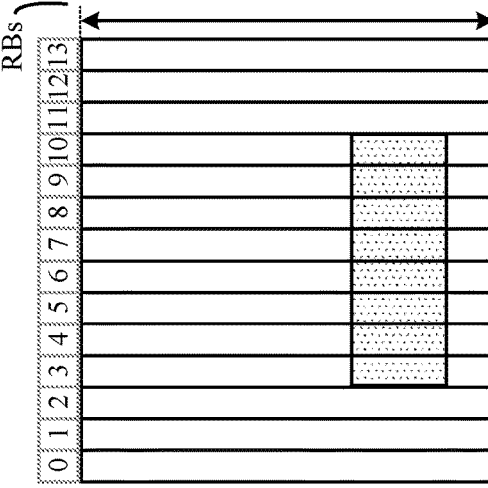
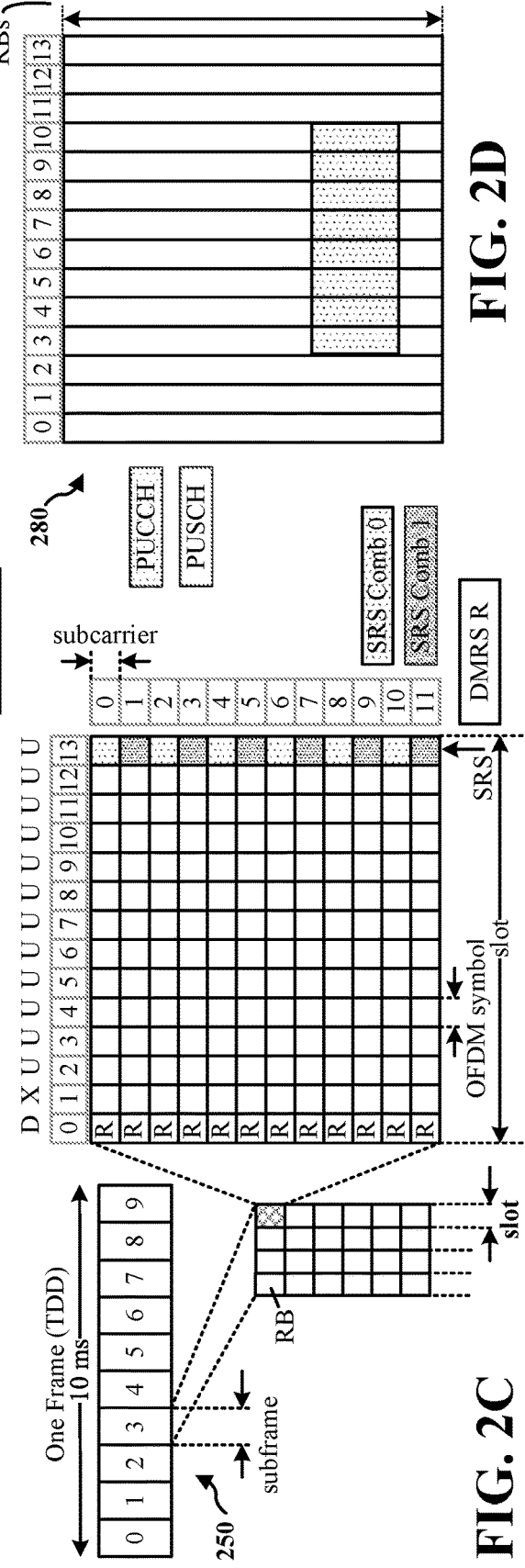

CHANNEL OCCUPANCY TIME BASED RADIO LINK MEASUREMENTS AND RADIO RESOURCE MEASUREMENTS IN SHARED SPECTRUM

CROSS REFERENCE TO RELATED APPLICATIONS

This application claims priority to U.S. Provisional Application No. 62/981,820 titled "CHANNEL OCCUPANCY TIME BASED RADIO LINK MEASUREMENTS AND RADIO RESOURCE MEASUREMENTS IN SHARED SPECTRUM," filed Feb. 26, 2020, which is assigned to the assignee hereof, and incorporated herein by reference in its entirety.

BACKGROUND

Technical Field

The present disclosure relates generally to communication systems, and more particularly, to radio link and radio resource measurements in shared spectrum.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a user equipment (UE). The method may include detecting a control channel transmission from a base station during a configured discovery reference signal window on shared spectrum. The method may include measuring synchronization signal blocks (SSBs) at expected SSB positions within a maximum SSB burst length starting from the control channel transmission during the discovery reference signal window.

The disclosure also provides an apparatus (e.g., a UE) including a memory storing computer-executable instructions and at least one processor configured to execute the computer-executable instructions to perform the above method, an apparatus including means for performing the above method, and a computer-readable medium storing computer-executable instructions for performing the above method.

In another aspect, the disclosure provides a method of wireless communication for a base station. The method may include transmitting a control channel transmission from a base station during a configured discovery reference signal window on shared spectrum. The method may include transmitting synchronization signal blocks (SSBs) at expected SSB positions within a maximum SSB burst length starting from the control channel transmission during the discovery reference signal window.

The disclosure also provides an apparatus (e.g., a base station) including a memory storing computer-executable instructions and at least one processor configured to execute the computer-executable instructions to perform the above method, an apparatus including means for performing the above method, and a computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G NR frame.

FIG. 2B is a diagram illustrating an example of DL channels within a 5G NR subframe.

FIG. 2C is a diagram illustrating an example of a second 5G NR frame.

FIG. 2D is a diagram illustrating an example of UL channels within a 5G NR subframe.

DETAILED DESCRIPTION

Figure 1:
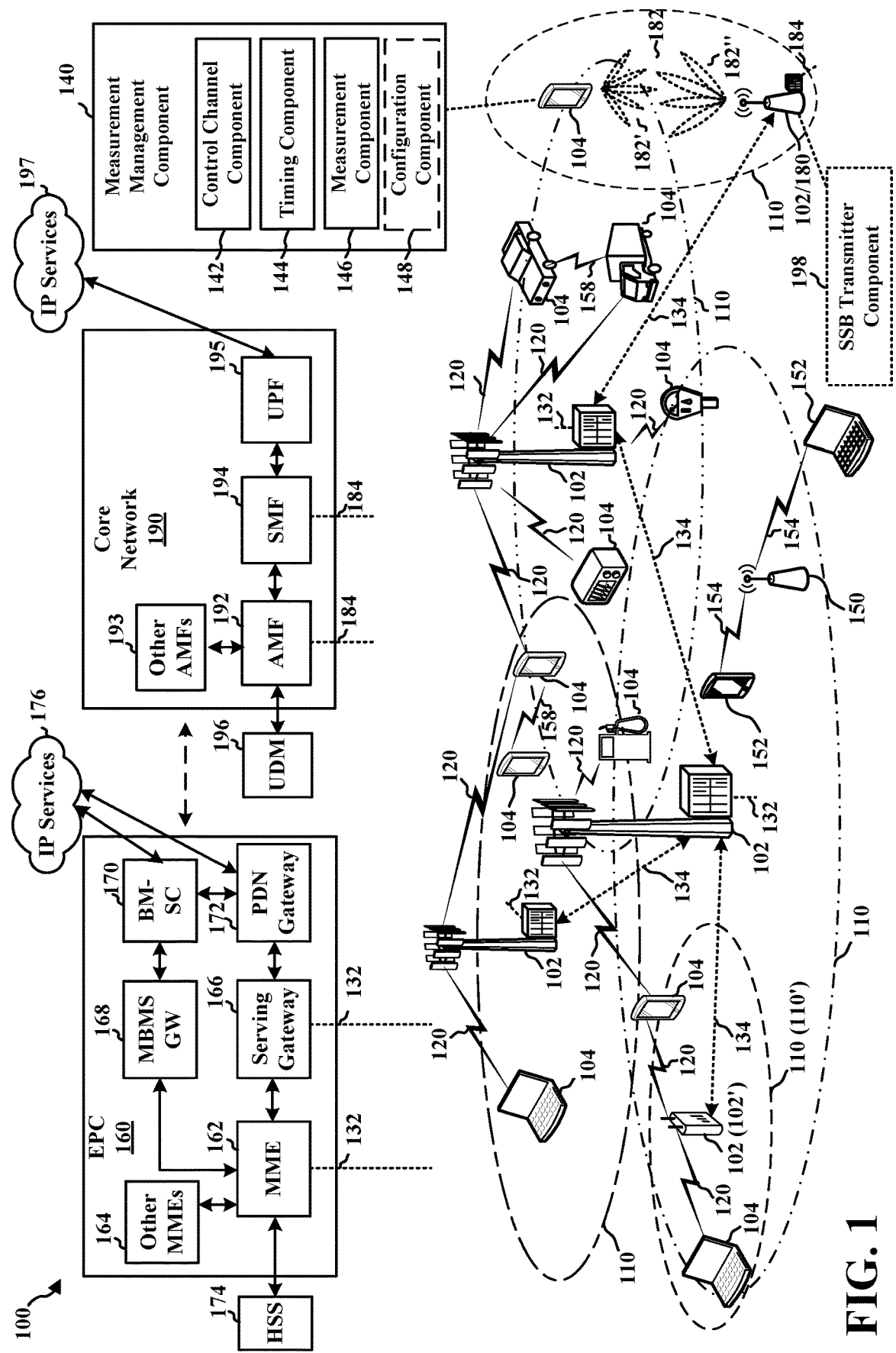
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A synchronization signal block (SSB) may include a primary synchronization signal (PSS), a secondary synchronization signal (SSS), and a broadcast channel (BCH). The SSB may be repeated periodically to allow a user equipment (UE) to discover a cell and synchronize with the cell. When a UE is connected to the cell, the UE may perform measurements on the SSBs (which act as pilot signals) for radio link management (RLM) and radio resource management (RRM). A base station may transmit SSBs using different beams in different time slots, and the UE may measure the different beams to determine a strongest beam. For example, the UE may measure a received signal strength (e.g., received signal strength indicator (RSSI)) of each beam and select the beam with the greatest RSSI. A UE may be configured with a discovery reference signal (DRS) window in which to measure SSBs. The DRS window may also be referred to as a DRS measurement timing configuration (DMTC) window.

In unlicensed or shared spectrum, a base station may perform a listen before talk (LBT) or clear channel assessment (CCA) procedure before transmitting. The shared spectrum may be unavailable when the base station is configured to transmit the SSBs. In an aspect, in order to provide flexibility and reliability for SSB delivery, a base station may select SSB positions on which to transmit the SSBs during the DRS window. In an implementation, the entire DRS window may include different SSB positions that the base station may select. The base station, however, may transmit a maximum number (e.g., 8) of SSBs that is less than the number of SSB positions within the DRS window. One issue with the flexible approach of using numerous SSB positions is that a UE may monitor the entire DRS window for SSBs in order to perform the RLM measurements and RRM measurements on the transmitted SSBs. The UE consumes power while monitoring the entire DRS window.

In unlicensed or shared spectrum, a base station may obtain access to the spectrum for a channel occupancy time (COT). The base station may transmit a COT structure indicator (COT-SI) indicating how the COT is to be used. In an aspect, once the base station has obtained access to the spectrum for the COT, there is no reason for the base station to delay transmission of the SSBs. Instead, the base station may select SSB positions to transmit the SSBs in the DRS window as early as possible. Accordingly, the base station may select SSB positions immediately after the COT-SI or another control channel transmission for transmission of the SSBs.

In an aspect of the present disclosure, a UE may be configured to monitor for the COT-SI or another downlink control channel transmission indicating that the base station has access to the shared spectrum during the DRS window. The UE may then determine expected SSB positions for the SSBs after the control channel transmission. The UE may measure the expected SSB positions to perform the RLM measurements and RRM measurements. After the expected SSB positions, the UE may stop the measuring, which may reduce power consumption in the UE. For example, the UE may enter a sleep mode in which one or more reception components are powered down. Accordingly, the present disclosure may reduce power consumption of the UE.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include a measurement management component 140 that manages when the UE 104 performs RLM measurements and/or RRM measurements on SSBs. The measurement management component 140 may include a control channel receiver 142 that detects a control channel transmission from a base station during a DRS window on a shared spectrum. The measurement management component 140 may include a timing component 144 that determines, in response to the control channel transmission, expected SSB positions within a maximum SSB length of the control channel transmission during the DRS window. The measurement management component 140 may include a measurement component that measures the SSBs at the expected SSB positions. The measurement management component 140 may optionally include a configuration component 148 that receives one or more configuration messages that configure the DRS window, the maximum SSB length and/or a maximum number of SSBs.

Figure 4:
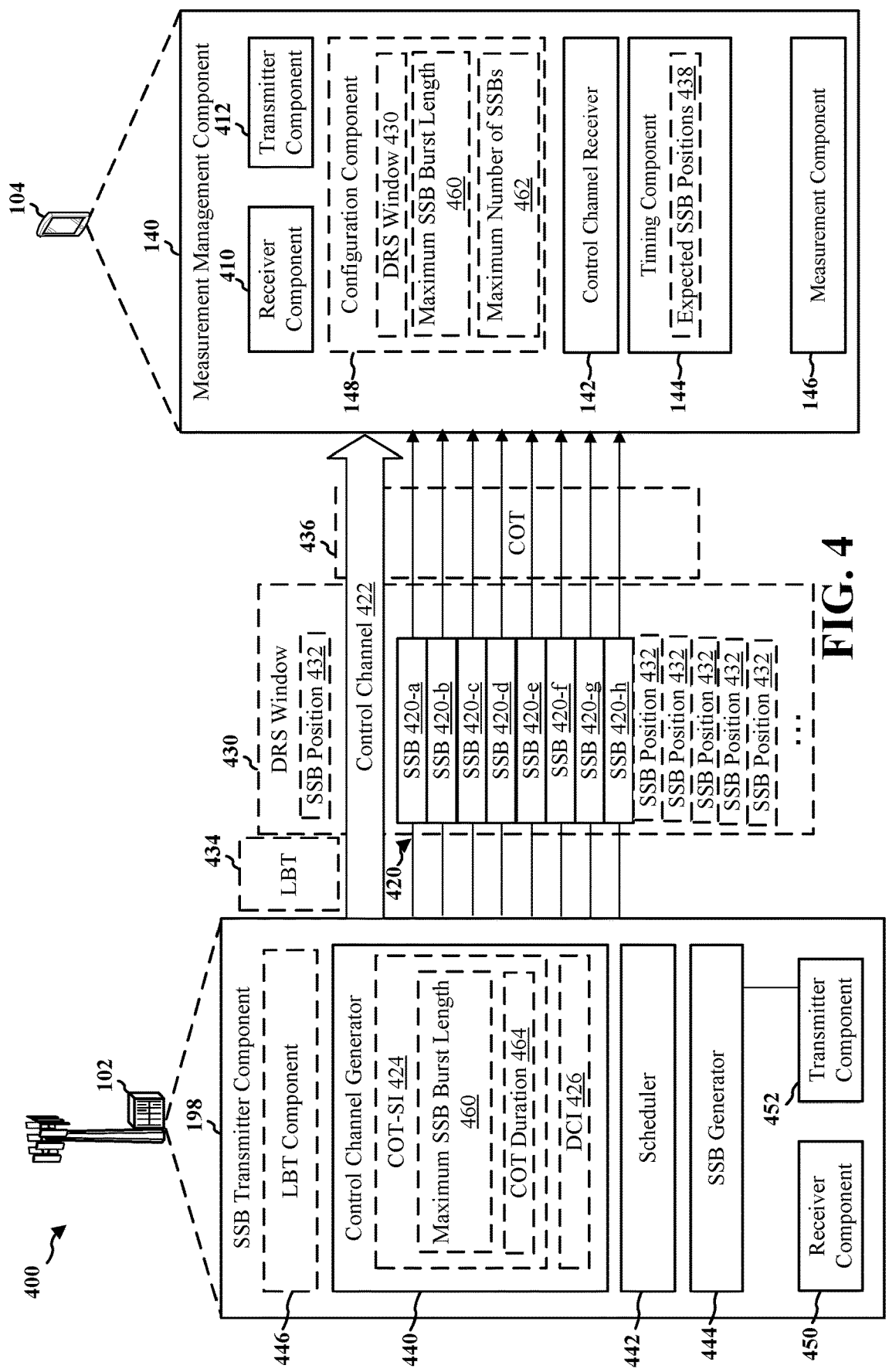
FIG. 4 is a diagram illustrating example communications and components of a base station and a UE.
Figure 7:
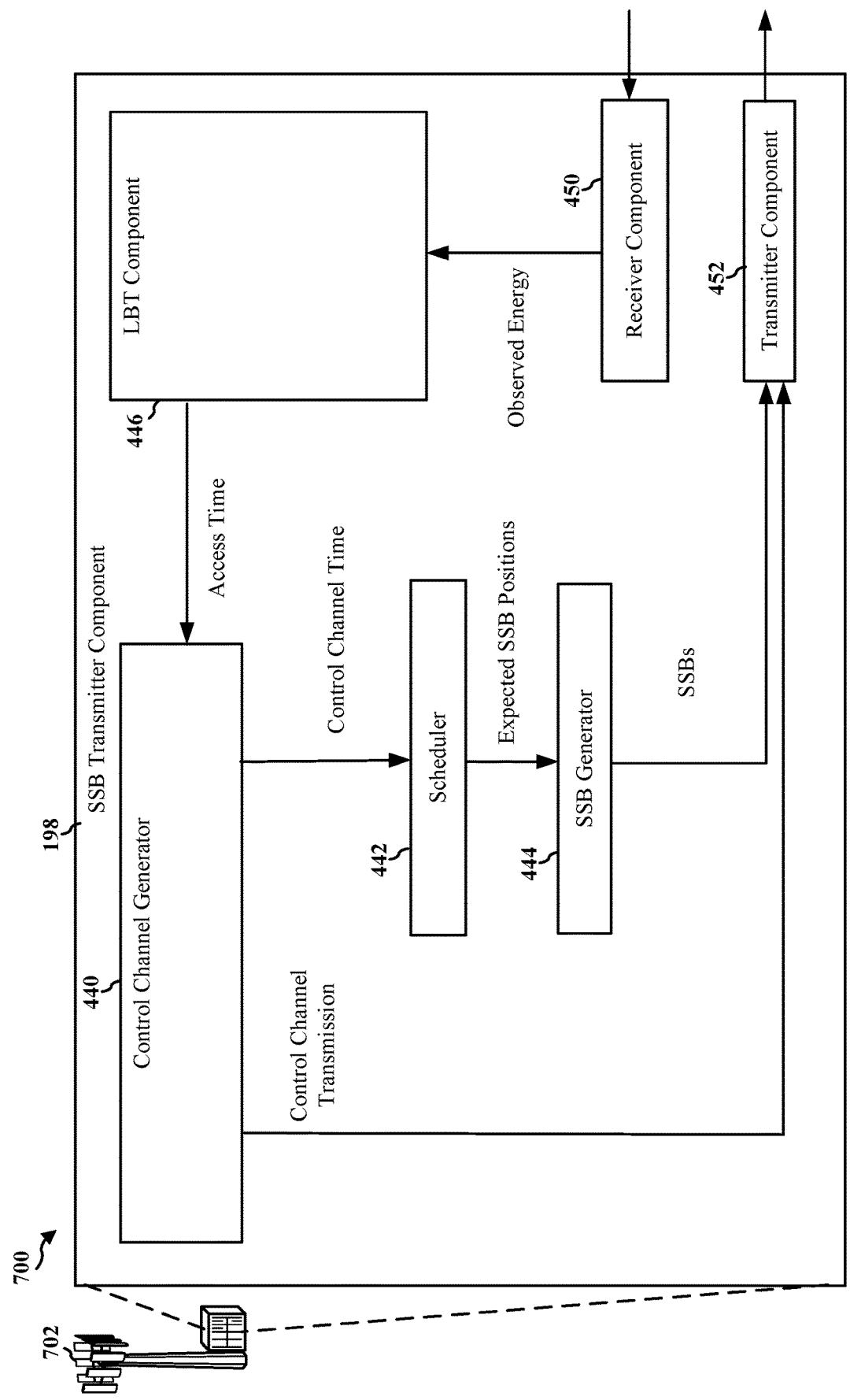
FIG. 7 is a conceptual data flow diagram illustrating the data flow between different means/components in an example base station.

In an aspect, one or more of the base stations 102 may include a SSB transmitter component 198 that transmits SSBs in SSB positions following a control channel transmission during a DRS window on shared spectrum. As illustrated in FIGS. 4 and 7, the SSB transmitter component 198 may include, for example, a control channel generator 440 that generates a control channel transmission such as a COT-SI for transmission during a DRS window. The SSB transmitter component 198 may include a scheduler 442 that determines, based on the control channel transmission, expected SSB positions within the maximum SSB length of the control channel transmission during the DRS window. The SSB transmitter component 198 may include an SSB generator 444 that generates the SSBs for transmission at the expected SSB positions. The SSB transmitter component 198 may optionally include an LBT component 446 that performs an LBT procedure or a CCA procedure prior to the control channel transmission.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL).

While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
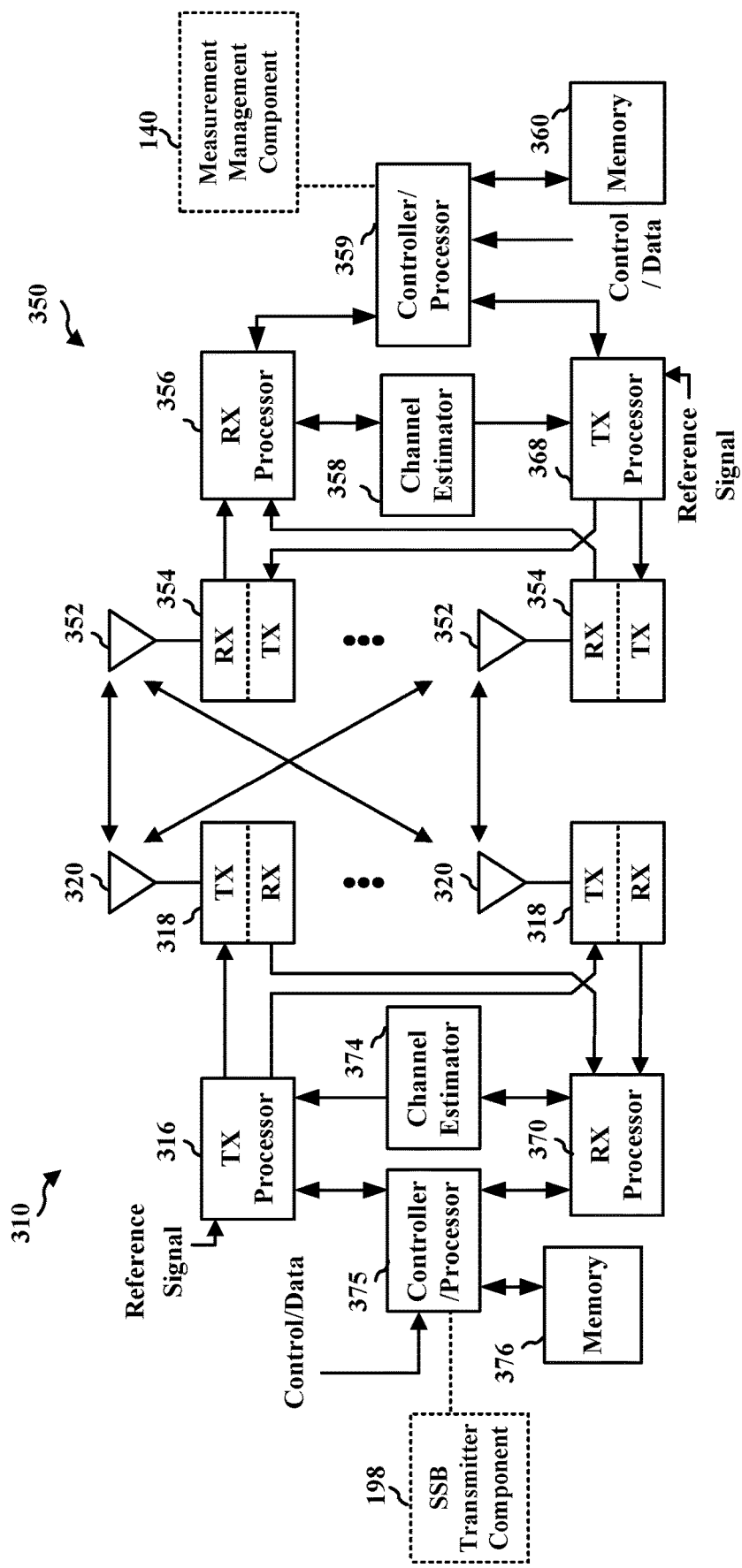
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the measurement management component 140 of FIG. 1.

At least one of the TX processor 316, the RX processor 370, and the controller/processor 375 may be configured to perform aspects in connection with the SSB transmitter component 198 of FIG. 1.

FIG. 4 is a diagram 400 illustrating example communications and components of a base station 102 and a UE 104. The UE 104 may include the measurement management component 140. The base station 102 may include the SSB transmitter component 198.

As discussed above regarding FIG. 1, the measurement management component 140 may include the control channel receiver 142, the timing component 144, and the measurement component 146, and optionally include the configuration component 148. The UE 104 may also include a receiver component 410 and a transmitter component 412. The receiver component 410 may include, for example, a RF receiver for receiving the signals described herein. The transmitter component 412 may include for example, an RF transmitter for transmitting the signals described herein. In an aspect, the receiver component 410 and the transmitter component 412 may be co-located in a transceiver.

The SSB transmitter component 198 may include the control channel generator 440, the scheduler 442, the SSB generator 444, and optionally include the LBT component 446. The SSB transmitter component 198 may also include a receiver component 450 and a transmitter component 452. The receiver component 450 may include, for example, a RF receiver for receiving the signals described herein. The transmitter component 452 may include for example, an RF transmitter for transmitting the signals described herein. In an aspect, the receiver component 450 and the transmitter component 452 may be co-located in a transceiver.

The SSB transmitter component 198 may transmit SSBs 420 during a DRS window 430. The DRS window 430 may be configured such that the UE 104 and/or the measurement management component 140 may periodically measure SSBs 420 to perform RLM measurements and RRM measurements. The DRS window 430 may include SSB positions 432, which may also be referred to as SSB candidate positions. For example, for a 30 KHz sub-carrier spacing, the DRS window 430 may include twenty (20) SSB positions 432, or for a 15 KHz sub-carrier spacing, the DRS window 430 may include ten (10) SSB positions 432. The SSB transmitter component 198 and/or the scheduler 442 may determine on which SSB positions 432 to transmit the SSBs 420.

The SSB transmitter component 198 and/or the LBT component 446 may perform a LBT procedure or a CCA procedure in order to access the shared spectrum. Since other users or technologies may access the shared spectrum, the SSB transmitter component 198 may be unable to access the shared spectrum during an LBT period 434. Accordingly, the SSB transmitter component 198 and/or the scheduler 442 may be unable to select SSB positions 432 during the LBT period 434. Once the SSB transmitter component 198 completes the LBT procedure or the CCA procedure and gains access to the shared spectrum, the SSB transmitter component 198 may start a COT 436 during which the SSB transmitter component 198 reserves the shared spectrum for the base station 102 and connected UEs 104. The COT 436 may have a duration, which may be limited based on the LBT or CCA procedure.

The SSB transmitter component 198 and/or the control channel generator 440 may transmit a control channel transmission 422 during the COT 436. For example, the control channel transmission 422 may be a COT-SI 424 or a DCI 426. The control channel transmission 422 may include a cyclic redundancy check (CRC) portion that is scrambled with a radio network temporary identifier (RNTI). Accordingly, the measurement management component 140 and/or the control channel receiver 142 may be able to detect the control channel transmission 422 and confirm that the control channel transmission 422 was correctly received. In the case of a COT-SI 424, the COT-SI may indicate a maximum SSB burst length. For instance, in a first option, the COT-SI 424 may include a bit field indicating a maximum SSB burst length 460, or in a second option, the COT-SI 424 may include a COT duration field 464.

In an aspect, the scheduler 442 may schedule the SSBs 420 in consecutive slots following the control channel transmission 422. That is, the scheduler 442 may select SSB positions 432 based on the control channel transmission 422. At the UE 104, the timing component 144 may determine the expected SSB positions 438 based on the control channel transmission 422. In particular, the scheduler 442 and the timing component 144 may determine the expected SSB positions 438 for a maximum number of SSBs 462 in a configured maximum SSB burst length 460. For example, the maximum number of SSBs 462 may be specified in a standard document or regulation. As illustrated, the maximum number of SSBs 462 may be 8. Accordingly, the scheduler 442 and the timing component 144 may determine the expected SSB positions 438 for SSBs 420-a, 420-b, 420-c, 420-d, 420-e, 420-f, 420-g, and 420-h. The maximum SSB burst length 460 may be a period of time for transmitting the maximum number of SSBs 462. For example, each SSB may use one half slot for transmission, and the maximum SSB burst length 460 may be 4 slots. The SSB generator 444 may generate the SSBs 420 for transmission via the transmitter component 452. The measurement component 146 may measure each of the SSBs 420. In an aspect, the SSB transmitter component 198 may complete transmission of the SSBs 420 within the maximum SSB burst length 460 from the control channel transmission 422. Accordingly, the measurement component 146 may stop measuring after the maximum SSB burst length. Therefore, the measurement component 146 may reduce power consumption during the DRS window 430 and/or the COT 436 by performing fewer measurements during the DRS window 430 or entering a sleep mode in which one or more components are powered down during the DRS window 430. In an aspect, as discussed in further detail below regarding FIGS. 5 and 6, the DRS window 430 and/or the COT 436 may expire before all of the SSBs 420 may be transmitted. The measurement component 146 may stop measuring at the end of the DRS window 430 and/or the COT 436.

Figure 5:
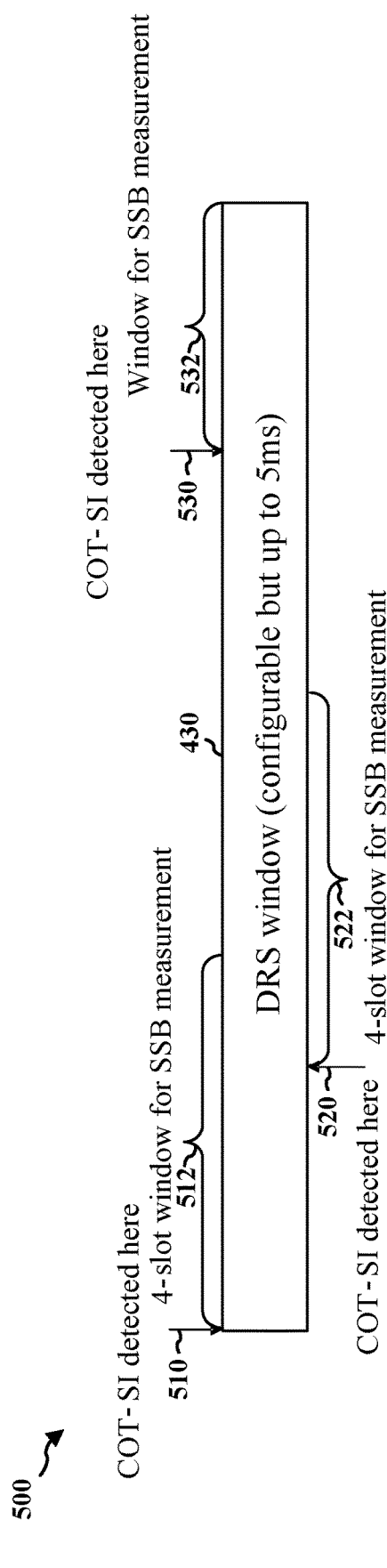
FIG. 5 is a timing diagram illustrating various example windows for transmitting synchronization signal blocks (SSBs) based on detection of a control channel transmission.

FIG. 5 is a timing diagram 500 illustrating various example measurement windows within a DRS window 430 depending on a timing of a received control channel transmission (e.g., COT-SI). In a first example, the SSB transmitter component 198 may obtain access to the shared spectrum and transmit the COT-SI 424 at the start of the DRS window 430. The COT-SI 424 may be received at time 510. The SSBs 420 may be transmitted within a 4-slot window 512. For instance, if a 30 KHz sub-carrier spacing is used, the 4 slots may take 2 ms, and the measurement management component 140 may stop measuring for the remainder of the DRS window 430. In a second example, the SSB transmitter component 198 may obtain access to the shared spectrum and transmit the COT-SI 424 in the first half of the DRS window 430. The control channel receiver 142 may receive the COT-SI 424 at time 520. The SSBs 420 may be transmitted within a 4-slot window 522. In a third example, the SSB transmitter component 198 may not obtain access to the shared spectrum until later in the DRS window 430. For instance, the control channel receiver 142 may not receive the COT-SI 424 until time 530. The remaining portion of the DRS window 430 may be insufficient to transmit the maximum number of SSBs 462. Accordingly, the window 532 may be less than 4 slots (e.g., 3 slots).

Figure 6:
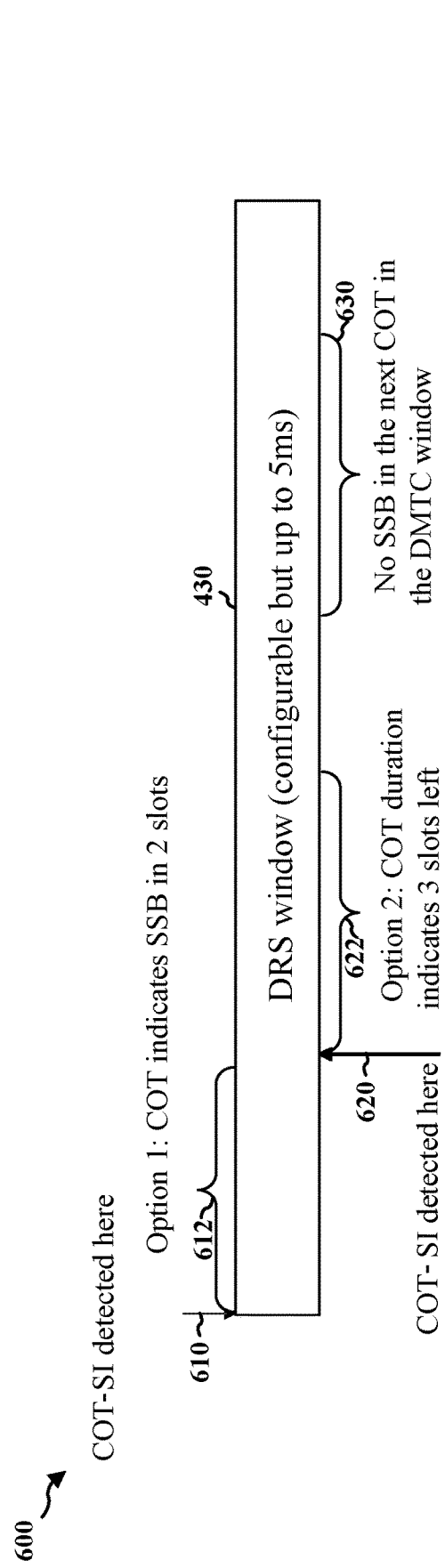
FIG. 6 is a timing diagram illustrating various example windows for transmitting SSBs based on a maximum SSB burst length indicated by a control channel transmission.

FIG. 6 is a timing diagram 600 illustrating various example measurement windows within a DRS window where a control channel transmission 422 indicates a maximum SSB burst length. For example, the control channel transmission 422 may be the COT-SI 424. In a first example, the SSB transmitter component 198 may obtain access to the shared spectrum and transmit the COT-SI 424 at the start of the DRS window 430 at time 610. In a first option, the COT-SI 424 may include an explicit bit field that indicates how long the SSBs 420 will be transmitted. For example, the bit field may indicate a number of SSBs (e.g., maximum number of SSBs 462) or a number of slots (e.g., maximum SSB burst length 460). For instance, as illustrated, the bit field may indicate 2 slots, and the SSB transmitter component 198 may transmit 4 SSBs 420 within the window 612. In a second example, the SSB transmitter component 198 may obtain access to the shared spectrum and transmit the COT-SI 424 in the first half of the DRS window 430 at time 620. In a second option, a COT duration field 464 in the COT-SI 424 may indicate how long the SSBs 420 will be transmitted. The window 622 for transmitting SSBs may be the minimum of the remaining COT duration indicated by the COT duration field 464 and the maximum SSB burst length 460 (e.g., 4 slots). For instance, as illustrated, the COT duration field 464 may indicate 3 slots, and the SSB transmitter component 198 may transmit the SSBs 420 within the 3 slots of window 622. For the second option, the SSB transmitter component 198 may not transmit SSBs 420 in a second COT 630 within the DRS window 430 because the measurement management component 140 may not expect such SSB transmissions based on the indicated COT duration.

FIG. 7 is a conceptual data flow diagram 700 illustrating the data flow between different means/components in an example base station 702, which may be an example of the base station 102 including the SSB transmitter component 198.

Just prior to a DRS window 430, the receiver component 450 may receive signals on the shared spectrum. The receiver component 450 may determine an observed energy level and provide the observed energy level to the LBT component 446. The LBT component 446 may perform an LBT procedure or a CCA procedure based on the observed energy. For example, an LBT procedure or CCA procedure may include determining whether the observed energy is less than a threshold level before transmitting. In an aspect, if the shared spectrum is occupied, the LBT procedure or the CCA procedure may continue during the LBT period 434 and the SSB transmitter component 198 may not be able to transmit the SSBs 420. Once the LBT component 446 completes the LBT procedure or the CCA procedure, the LBT component 446 may start a COT 436 and provide the control channel generator with an access time indicating that the SSB transmitter component 198 has access to the shared spectrum.

The control channel generator 440 may generate a control channel transmission 422 for transmission after the access time. For example, the control channel generator 440 may generate the COT-SI 424 or a DCI 426. The control channel generator 440 may provide the control channel transmission 422 to the transmitter component 452 for transmission. The control channel generator 440 may provide a control channel time to the scheduler 442.

The scheduler 442 may receive the control channel time from the control channel generator 440 and determine expected SSB positions 438 based on the control channel time. For example, the expected SSB positions 438 may be a number of consecutive SSB positions 432 following the control channel transmission 422. The scheduler 442 may limit the number of expected SSB positions 438 based on a maximum SSB burst length and/or a COT duration. The scheduler 442 may provide the expected SSB positions 438 to the SSB generator 444.

The SSB generator 444 may receive the expected SSB positions 438 and generate the SSBs 420 for transmission via the transmitter component 452. For example, the SSB generator 444 may determine a beam for transmitting each SSB 420 and determine an index of each SSB 420. Accordingly, when the UE 104 receives an SSB 420, the UE 104 may determine a beam based on the index of the SSB 420.

Figure 8:
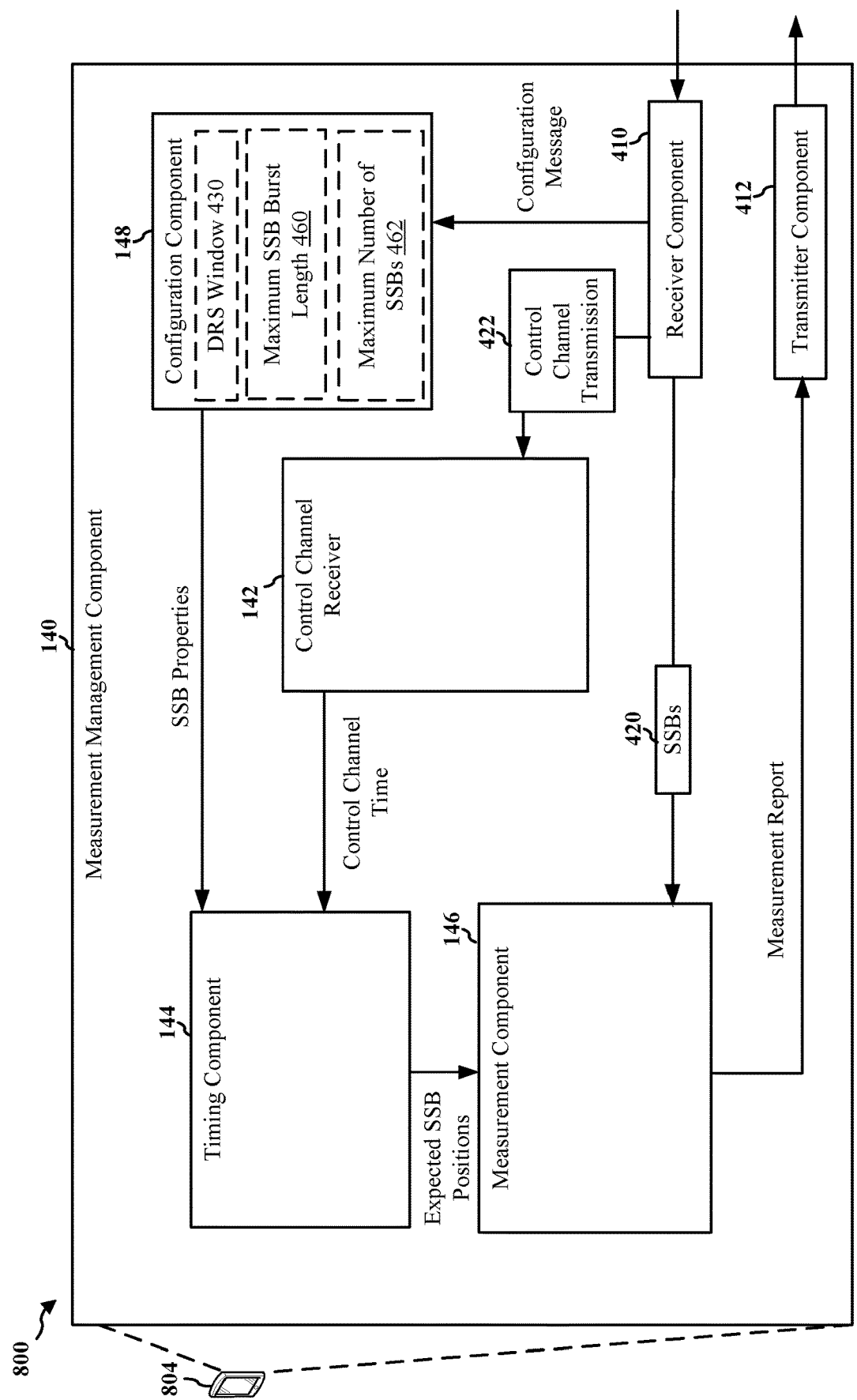
FIG. 8 is a conceptual data flow diagram illustrating the data flow between different means/components in an example UE.

FIG. 8 is a conceptual data flow diagram 800 illustrating the data flow between different means/components in an example UE 804, which may be an example of the UE 104 and include the measurement management component 140.

The receiver component 410 may receive downlink signals including configuration messages, the control channel transmission 422, and SSBs 420. The receiver component 410 may pass configuration messages, such as an RRC message or MAC-CE, to the configuration component 148. The receiver component 410 may pass the control channel transmission 422 to the control channel receiver 142. The receiver component 410 may pass the SSBs 420 to the measurement component 146.

The configuration component 148 may determine various configured properties of the SSBs 420. For example, the configuration component 148 may determine the DRS window 430, the maximum SSB burst length 460, and/or the maximum number of SSBs 462. The configuration component 148 may determine the SSB properties based on a received configuration message, or based on specified values in a standard document or regulation. The configuration component 148 may provide the SSB properties to the timing component 144.

The control channel receiver 142 may be configured to search a control resource set (CORESET) for the control channel transmission 422. The control channel receiver 142 may attempt to decode received transmissions using a DCI format. The control channel receiver 142 may verify received control channel transmissions 422 based on a CRC portion of the transmission. Accordingly, the control channel receiver 142 may determine when a serving cell has transmitted the control channel transmission 422. The control channel receiver 142 may assume that the base station 102 transmitting the control channel transmission 422 has reserved access to the shared spectrum for a COT 436. The control channel receiver 142 may determine the time of the control channel transmission 422 and provide the control channel time to the timing component 144.

The timing component 144 may receive the SSB properties from the configuration component 148 and receive the control channel time from the control channel receiver 142. The timing component 144 may determine expected SSB positions based on the SSB properties and the control channel time. For example, the timing component 144 may determine that the expected SSB positions are a number of consecutive SSB positions 432 equal to the maximum number of SSBs 462 starting after the control channel time. In an aspect, where a remaining portion of the DRS window 430 is less than the maximum SSB burst length 460, the timing component 144 may determine that the expected SSB positions are the remaining SSB positions 432. In an aspect, where the control channel transmission is a COT-SI indicating the maximum SSB burst length 460, the timing component 144 may determine the expected SSB positions corresponding to the indicated maximum SSB burst length 460. The timing component 144 may provide the expected SSB positions to the measurement component 146.

The measurement component 146 may receive the expected SSB positions from the timing component 144 and perform measurements on the SSBs 420 at the expected SSB positions. The measurements may include RLM measurements such as received power, path loss, signal-to-noise ratio (SNR), or signal to interference plus noise ratio (SINR) and RRM measurements such as reference signal received power (RSRP), received signal strength indicator (RSSI), or reference signal received quality (RSRQ). In an aspect, the measurement component 146 may generate a measurement report including the RLM measurements and/or RRM measurements. The measurement component 146 may transmit the measurement report via the transmitter component 412.

Figure 9:
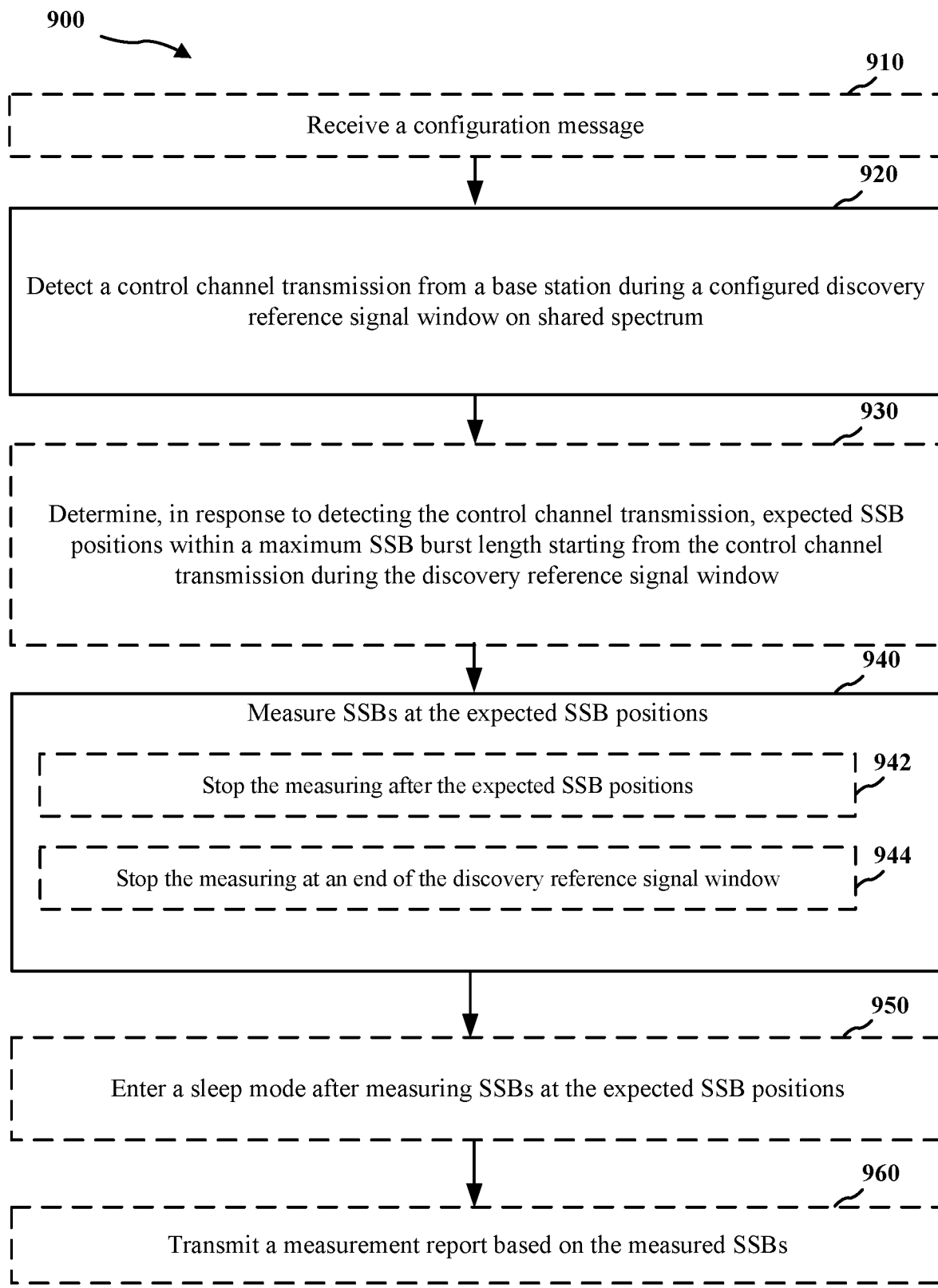
FIG. 9 is a flowchart of an example of a method of wireless communication for a UE.

FIG. 9 is a flowchart of an example method 900 for measuring SSBs. The method 900 may be performed by a UE (such as the UE 104, which may include the memory 360 and which may be the entire UE 104 or a component of the UE 104 such as the measurement management component 140, TX processor 368, the RX processor 356, or the controller/processor 359). The method 900 may be performed by the measurement management component 140 in communication with the SSB transmitter component 198 of the base station 102.

At block 910, the method 900 may optionally include receiving a configuration message. In an aspect, for example, the UE 104, the RX processor 356 and/or the controller/processor 359 may execute the measurement management component 140 and/or the configuration component 148 to receive a configuration message (e.g., a RRC message). Accordingly, the UE 104, the RX processor 356, and/or the controller/processor 359 executing the measurement management component 140 and/or the configuration component 148 may provide means for receiving a configuration message.

At block 920, the method 900 may include detecting a control channel transmission from a base station during a configured discovery reference signal window on shared spectrum. In an aspect, for example, the UE 104, the RX processor 356 and/or the controller/processor 359 may execute the measurement management component 140 and/or the control channel receiver 142 to detect a control channel transmission 422 from a base station 102 during a configured DRS window 430 on shared spectrum. In an implementation, the control channel transmission 422 is the COT-SI 424. The COT-SI 424 may indicate the maximum SSB burst length 460. For example, the COT-SI 424 may include an explicit bit field indicating the maximum SSB burst length 460. As another example, the COT-SI 424 may include a channel occupancy time duration field 464. The maximum SSB burst length 460 may be determined as a minimum of the channel occupancy time duration and a number of slots equal to half of a configured maximum number of SSBs 462. Alternatively, the control channel transmission 422 may be a DCI 426. Accordingly, the UE 104, the RX processor 356, and/or the controller/processor 359 executing the measurement management component 140 and/or the control channel receiver 142 may provide means for detecting a control channel transmission from a base station during a configured discovery reference signal window on shared spectrum.

At block 930, the method 900 may optionally include determining, in response to detecting the control channel transmission, expected SSB positions within a maximum SSB burst length starting from the control channel transmission during the discovery reference signal window. In an aspect, for example, the UE 104, the RX processor 356 and/or the controller/processor 359 may execute the measurement management component 140 and/or the timing component 144 to determine, in response to detecting the control channel transmission 422, expected SSB positions 438 within a maximum SSB burst length 460 starting from the control channel transmission 422 during the DRS window 430. Accordingly, the UE 104, the RX processor 356, and/or the controller/processor 359 executing the measurement management component 140 and/or the configuration component 148 may provide means for determining, in response to detecting the control channel transmission, expected SSB positions within a maximum SSB burst length starting from the control channel transmission during the discovery reference signal window.

At block 940, the method 900 may include measuring SSBs at the expected SSB positions. In an aspect, for example, the UE 104, the RX processor 356 and/or the controller/processor 359 may execute the measurement management component 140 and/or the measurement component 146 to measure SSBs 420 at the expected SSB positions 438. In an aspect, at sub-block 942, the block 940 may optionally include stopping the measuring after the expected SSB positions. For example, the measurement component 146 may stop the measuring after the expected SSB positions 438 when there is a remaining portion of the DRS window after the expected SSB positions 438 (e.g., after windows 512 and 522 in FIG. 5). Accordingly, the measurement component 146 may conserve power. As another example, in sub-block 944, the block 940 may include stopping the measuring at an end of the DRS window 430. For instance, the DRS window 430 may end at the same time as the expected SSB positions 438 (e.g., window 532 in FIG. 5). In view of the foregoing, the UE 104, the RX processor 356, and/or the controller/processor 359 executing the measurement management component 140 and/or the measurement component 146 may provide means for measuring SSBs at the expected SSB positions.

At block 950, the method 900 may optionally include entering a sleep mode after measuring SSBs at the expected SSB positions. In an aspect, for example, the UE 104, the RX processor 356 and/or the controller/processor 359 may execute the measurement management component 140 and/or the measurement component 146 to enter a sleep mode after measuring SSBs 420 at the expected SSB positions 438. Accordingly, the UE 104, the RX processor 356, and/or the controller/processor 359 executing the measurement management component 140 and/or the measurement component 146 may provide means for entering a sleep mode after measuring SSBs at the expected SSB positions.

At block 960, the method 900 may optionally include transmitting a measurement report based on the measured SSBs. In an aspect, for example, the UE 104, the TX processor 368 and/or the controller/processor 359 may execute the measurement management component 140 and/or the measurement component 146 to transmit a measurement report based on the measured SSBs 420. Accordingly, the UE 104, the TX processor 368, and/or the controller/processor 359 executing the measurement management component 140 and/or the measurement component 146 may provide means for transmitting a measurement report based on the measured SSBs.

Figure 10:
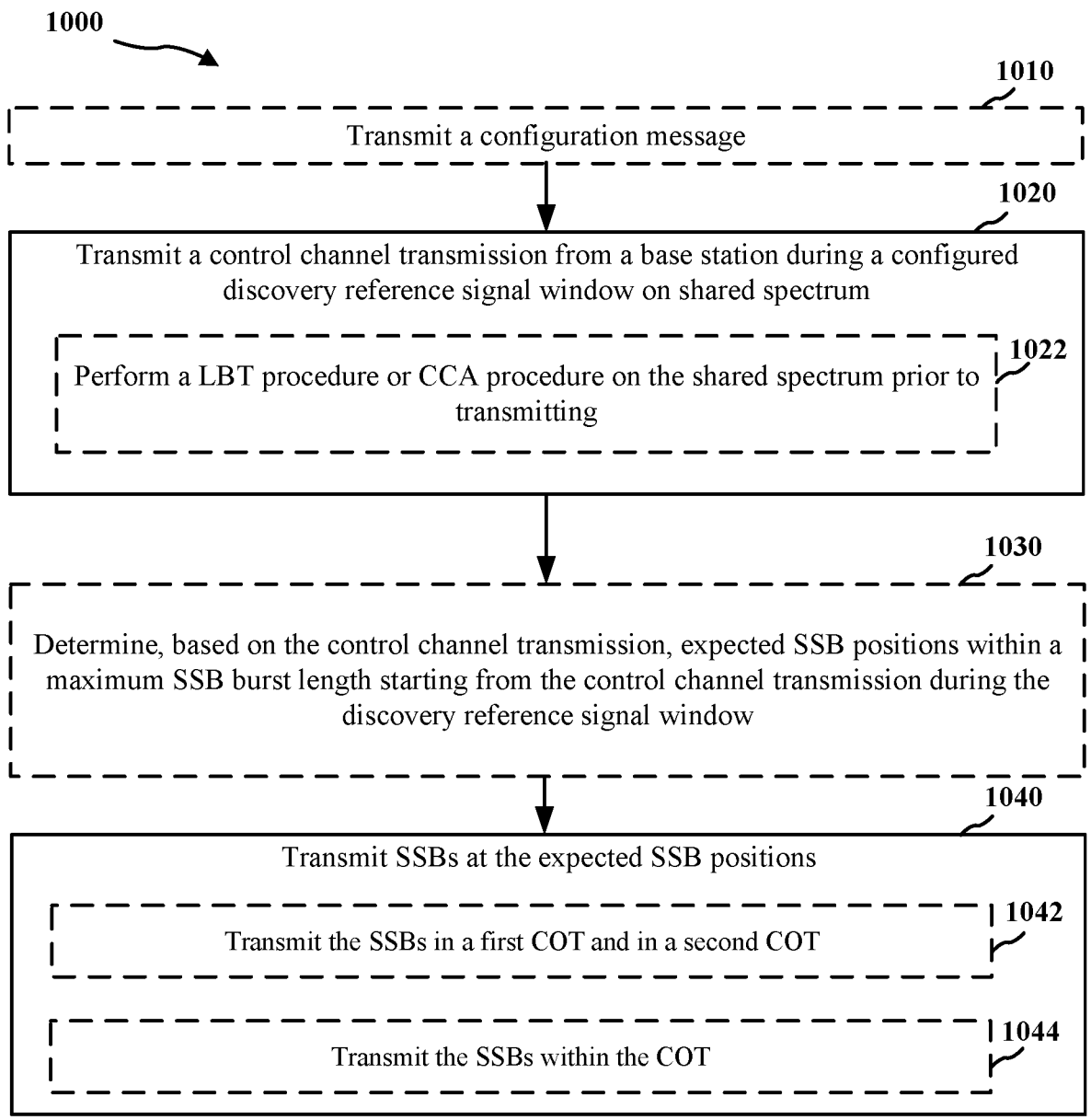
FIG. 10 is a flowchart of an example of a method of wireless communication for a base station.

FIG. 10 is a flowchart of an example method 1000 for transmitting SSBs to be used for measurements. The method 1000 may be performed by a base station (such as the base station 102, which may include the memory 376 and which may be the entire base station 102 or a component of the base station 102 such as the SSB transmitter component 198, TX processor 316, the RX processor 370, or the controller/processor 375). The method 1000 may be performed by the SSB transmitter component 198 in communication with the measurement management component 140 of the UE 104.

At block 1010, the method 1000 may optionally include transmitting a configuration message. In an aspect, for example, the base station 102, the controller/processor 375, and/or the TX processor 316 may execute the SSB transmitter component 198 and/or the transmitter component 452 to transmit a configuration message (e.g., RRC message). Accordingly, the base station 102, the controller/processor 375, and/or the TX processor 316 executing the SSB transmitter component 198 and/or the transmitter component 452 may provide means for transmitting a configuration message.

At block 1020, the method 1000 may include transmitting a control channel transmission from a base station during a configured discovery reference signal window on shared spectrum. In an aspect, for example, the base station 102, the controller/processor 375, and/or the TX processor 316 may execute the SSB transmitter component 198 and/or the control channel generator 440 to transmit a control channel transmission 422 from the base station 102 during a configured DRS window 430 on shared spectrum. Accordingly, the base station 102, the controller/processor 375, and/or the TX processor 316 executing the SSB transmitter component 198 and/or the control channel generator 440 may provide means for transmitting a control channel transmission from a base station during a configured discovery reference signal window on shared spectrum.

In an aspect, at sub-block 1022, the block 1020 may optionally include performing a LBT procedure or a CCA procedure on the shared spectrum prior to transmitting the control channel transmission. For example, the base station 102, the controller/processor 375, and/or the TX processor 316 may execute the SSB transmitter component 198 and/or the LBT component 446 to perform the LBT procedure or the CCA procedure on the shared spectrum prior to transmitting the control channel transmission 422. Accordingly, the base station 102, the controller/processor 375, and/or the TX processor 316 executing the SSB transmitter component 198 and/or the LBT component 446 may provide means for performing a LBT procedure or a CCA procedure on the shared spectrum prior to transmitting the control channel transmission.

At block 1030, the method 1000 may optionally include determining, based on the control channel transmission, expected SSB positions within a maximum SSB burst length starting from the control channel transmission during the discovery reference signal window. In an aspect, for example, the base station 102, the controller/processor 375, and/or the TX processor 316 may execute the SSB transmitter component 198 and/or the scheduler 442 to determine, based on the control channel transmission, expected SSB positions within a maximum SSB burst length 460 starting from the control channel transmission 422 during the DRS window 430. Accordingly, the base station 102, the controller/processor 375, and/or the TX processor 316 executing the SSB transmitter component 198 and/or the transmitter component 452 may provide means for determining, based on the control channel transmission, expected SSB positions within a maximum SSB burst length starting from the control channel transmission during the discovery reference signal window.

At block 1040, the method 1000 may include transmitting SSBs at the expected SSB positions. In an aspect, for example, the base station 102, the controller/processor 375, and/or the TX processor 316 may execute the SSB transmitter component 198 and/or the SSB generator 444 to transmit SSBs 420 at the expected SSB positions 438. In an aspect, at sub-block 1042, the block 1040 may include transmitting the SSBs 420 in a first COT and in a second COT 630. For instance, when the COT-SI 424 indicates a maximum SSB burst length 460 that is greater than a COT duration, the SSB generator 444 may transmit remaining SSBs 420 in a second COT 630. In contrast, at sub-block 1044, the block 1040 may optionally include transmitting the SSBs 420 within the COT 436. For instance, the COT-SI 424 may include a COT duration field 464 indicating a COT duration that is less than a time to transmit the maximum number of SSBs 462, and the SSB generator 444 may stop transmitting at the end of the COT 436. In view of the foregoing, the base station 102, the controller/processor 375, and/or the TX processor 316 executing the SSB transmitter component 198 and/or the transmitter component 452 may provide means for transmitting SSBs at the expected SSB positions.

Some Further Example Implementations

1. A method of wireless communication, comprising:
detecting a control channel transmission from a base station during a configured discovery reference signal window on a shared spectrum; and
measuring synchronization signal blocks (SSBs) at expected SSB positions within a maximum SSB burst length starting from the control channel transmission during the discovery reference signal window.

2. The method of clause 1, wherein the control channel transmission is a channel occupancy time structure indicator (COT-SI).

3. The method of clause 1 or 2, wherein the maximum SSB burst length is a number of slots equal to half of a configured maximum number of SSBs.

4. The method of any of clauses 1-3, wherein measuring the SSBs at the expected SSB positions comprises stopping the measuring after the expected SSB positions.

5. The method of any of clauses 1-3, wherein measuring the SSBs at the expected SSB positions comprises stopping the measuring at an end of the discovery reference signal window.

6. The method of any of clauses 1-5, wherein the control channel transmission indicates the maximum SSB burst length.

7. The method of clause 6, wherein the control channel transmission includes an explicit bit field indicating the maximum SSB burst length.

8. The method of clause 6, wherein the control channel transmission includes a channel occupancy time duration, and wherein the maximum SSB burst length is a minimum of the channel occupancy time duration and a number of slots equal to half of a configured maximum number of SSBs.

9. The method of any of clauses 1-8, further comprising entering a sleep mode after measuring SSBs at the expected SSB positions.

10. The method of any of clauses 1-9, wherein the expected SSB positions consist of a configured number of consecutive SSB positions following the control channel transmission.

11. A method of wireless communication, comprising:
transmitting a control channel transmission from a base station during a configured discovery reference signal window on a shared spectrum; and
transmitting synchronization signal block (SSB) at expected SSB positions within a maximum SSB burst length starting from the control channel transmission during the discovery reference signal window.

12. The method of clause 11, wherein the control channel transmission is a channel occupancy time system information (COT-SI).

13. The method of clause 11 or 12, wherein the maximum SSB burst length is a number of slots equal to half of a configured maximum number of SSBs.

14. The method of any of clauses 11-13, wherein the control channel transmission indicates the maximum SSB burst length.

15. The method of clause 14, wherein the control channel transmission includes an explicit bit field indicating the maximum SSB burst length.

16. The method of clause 15, wherein transmitting the SSBs at the expected SSB positions comprises transmitting the SSBs in a first COT and in a second COT.

17. The method of clause 14, wherein the control channel transmission includes a channel occupancy time duration and the maximum SSB burst length is a minimum of the channel occupancy time duration and a number of slots equal to half of a configured maximum number of SSBs.

18. The method of clause 17, wherein transmitting the SSBs at the expected SSB positions comprises transmitting the SSBs within the channel occupancy time duration.

19. The method of clause 18, wherein transmitting the control channel transmission comprises performing a listen before talk (LBT) procedure or clear channel assessment (CCA) procedure on the shared spectrum prior to transmitting the control channel transmission.

20. The method of any of clauses 11-19, wherein the expected SSB positions consist of a configured number of consecutive SSB positions following the control channel transmission.

21. An apparatus for wireless communication, comprising:
a memory storing computer-executable instructions; and
at least one processor coupled to the memory and configured to execute the computer-executable instructions to:
detect a control channel transmission from a base station during a configured discovery reference signal window on a shared spectrum; and
measure synchronization signal blocks (SSBs) at expected SSB positions within a maximum SSB burst length starting from the control channel transmission during the discovery reference signal window.

22. The apparatus of clause 21, wherein the control channel transmission is a channel occupancy time structure indicator (COT-SI).

23. The apparatus of clause 21 or 22, wherein the maximum SSB burst length is a number of slots equal to half of a configured maximum number of SSBs.

24. The apparatus of any of clauses 21-23, wherein the at least one processor is configured to stop the measuring after the expected SSB positions.

25. The apparatus of any of clauses 21-23, wherein the at least one processor is configured to stop the measuring at an end of the discovery reference signal window.

26. The apparatus of any of clauses 21-25, wherein the control channel transmission indicates the maximum SSB burst length.

27. The apparatus of clause 26, wherein the control channel transmission includes an explicit bit field indicating the maximum SSB burst length.

28. The apparatus of clause 26, wherein the control channel transmission includes a channel occupancy time duration, and wherein the maximum SSB burst length is a minimum of the channel occupancy time duration and a number of slots equal to half of a configured maximum number of SSBs.

29. The apparatus of any of clauses 21-28, wherein the at least one processor is configured to enter a sleep mode after measuring SSBs at the expected SSB positions.

30. The apparatus of any of clauses 21-29, wherein the expected SSB positions consist of a configured number of consecutive SSB positions following the control channel transmission.

31. An apparatus for wireless communication, comprising:
a memory storing computer-executable instructions; and
at least one processor coupled to the memory and configured to execute the computer-executable instructions to:
transmit a control channel transmission from a base station during a configured discovery reference signal window on a shared spectrum; and
transmit synchronization signal block (SSB) at expected SSB positions within a maximum SSB burst length starting from the control channel transmission during the discovery reference signal window.

32. The apparatus of clause 31, wherein the control channel transmission is a channel occupancy time system information (COT-SI).

33. The apparatus of clause 31 or 32, wherein the maximum SSB burst length is a number of slots equal to half of a configured maximum number of SSBs.

34. The apparatus of any of clauses 31-33, wherein the control channel transmission indicates the maximum SSB burst length.

35. The apparatus of clause 34, wherein the control channel transmission includes an explicit bit field indicating the maximum SSB burst length.

36. The apparatus of clause 35, wherein the at least one processor is configured to transmit the SSBs in a first COT and in a second COT.

37. The apparatus of clause 34, wherein the control channel transmission includes a channel occupancy time duration and the maximum SSB burst length is a minimum of the channel occupancy time duration and a number of slots equal to half of a configured maximum number of SSBs.

38. The apparatus of clause 37, wherein the at least one processor is configured to transmit the SSBs within the channel occupancy time duration.

39. The apparatus of clause 38, wherein the at least one processor is configured to perform a listen before talk (LBT) procedure or clear channel assessment (CCA) procedure on the shared spectrum prior to transmitting the control channel transmission.

40. The apparatus of any of clauses 31-39, wherein the expected SSB positions consist of a configured number of consecutive SSB positions following the control channel transmission.

41. An apparatus for wireless communication, comprising:
means for detecting a control channel transmission from a base station during a configured discovery reference signal window on a shared spectrum; and
means for measuring synchronization signal blocks (SSBs) at expected SSB positions within a maximum SSB burst length starting from the control channel transmission during the discovery reference signal window.

42. The apparatus of clause 41, wherein the control channel transmission is a channel occupancy time structure indicator (COT-SI).

43. The apparatus of clause 41 or 42, wherein the maximum SSB burst length is a number of slots equal to half of a configured maximum number of SSBs.

44. The apparatus of any of clauses 41-43, wherein the means for measuring the SSBs at the expected SSB positions is configured to stop the measuring after the expected SSB positions.

45. The apparatus of any of clauses 41-43, wherein the means for measuring the SSBs at the expected SSB positions is configured to stop the measuring at an end of the discovery reference signal window.

46. The apparatus of any of clauses 41-45, wherein the control channel transmission indicates the maximum SSB burst length.

47. The apparatus of clause 46, wherein the control channel transmission includes an explicit bit field indicating the maximum SSB burst length.

48. The apparatus of clause 46, wherein the control channel transmission includes a channel occupancy time duration, and wherein the maximum SSB burst length is a minimum of the channel occupancy time duration and a number of slots equal to half of a configured maximum number of SSBs.

49. The apparatus of any of clauses 41-48, further comprising means for entering a sleep mode after measuring SSBs at the expected SSB positions.

50. The apparatus of any of clauses 41-49, wherein the expected SSB positions consist of a configured number of consecutive SSB positions following the control channel transmission.

51. An apparatus for wireless communication, comprising:
means for transmitting a control channel transmission from a base station during a configured discovery reference signal window on a shared spectrum; and
means for transmitting synchronization signal block (SSB) at expected SSB positions within a maximum SSB burst length starting from the control channel transmission during the discovery reference signal window.

52. The apparatus of clause 51, wherein the control channel transmission is a channel occupancy time system information (COT-SI).

53. The apparatus of clause 51 or 52, wherein the maximum SSB burst length is a number of slots equal to half of a configured maximum number of SSBs.

54. The apparatus of any of clauses 51-53, wherein the control channel transmission indicates the maximum SSB burst length.

55. The apparatus of clause 54, wherein the control channel transmission includes an explicit bit field indicating the maximum SSB burst length.

56. The apparatus of clause 55, wherein the means for transmitting the SSBs at the expected SSB positions is configured to transmit the SSBs in a first COT and in a second COT.

57. The apparatus of clause 54, wherein the control channel transmission includes a channel occupancy time duration and the maximum SSB burst length is a minimum of the channel occupancy time duration and a number of slots equal to half of a configured maximum number of SSBs.

58. The apparatus of clause 57, wherein the means for transmitting the SSBs at the expected SSB positions is configured to transmit the SSBs within the channel occupancy time duration.

59. The apparatus of clause 58, wherein the means for transmitting the control channel transmission is configured to perform a listen before talk (LBT) procedure or clear channel assessment (CCA) procedure on the shared spectrum prior to transmitting the control channel transmission.

60. The apparatus of any of clauses 51-59, wherein the expected SSB positions consist of a configured number of consecutive SSB positions following the control channel transmission.

61. A non-transitory computer-readable medium storing computer executable code, the code when executed by a processor causes the processor to:
detect a control channel transmission from a base station during a configured discovery reference signal window on a shared spectrum; and
measure synchronization signal blocks (SSBs) at expected SSB positions within a maximum SSB burst length starting from the control channel transmission during the discovery reference signal window.

62. The non-transitory computer-readable medium of clause 61, wherein the control channel transmission is a channel occupancy time structure indicator (COT-SI).

63. The non-transitory computer-readable medium of clause 61 or 62, wherein the maximum SSB burst length is a number of slots equal to half of a configured maximum number of SSBs.

64. The non-transitory computer-readable medium of any of clauses 61-63, wherein the code to measure the SSBs at the expected SSB positions comprises code to stop the measuring after the expected SSB positions.

65. The non-transitory computer-readable medium of any of clauses 61-63, wherein the code to measure the SSBs at the expected SSB positions comprises code to stop the measuring at an end of the discovery reference signal window.

66. The non-transitory computer-readable medium of any of clauses 61-65, wherein the control channel transmission indicates the maximum SSB burst length.

67. The non-transitory computer-readable medium of clause 66, wherein the control channel transmission includes an explicit bit field indicating the maximum SSB burst length.

68. The non-transitory computer-readable medium of clause 66, wherein the control channel transmission includes a channel occupancy time duration, and wherein the maximum SSB burst length is a minimum of the channel occupancy time duration and a number of slots equal to half of a configured maximum number of SSBs.

69. The non-transitory computer-readable medium of any of clauses 61-68, further comprising code to enter a sleep mode after measuring SSBs at the expected SSB positions.

70. The non-transitory computer-readable medium of any of clauses 61-69, wherein the expected SSB positions consist of a configured number of consecutive SSB positions following the control channel transmission.

71. A non-transitory computer-readable medium storing computer executable code, the code when executed by a processor causes the processor to:
transmit a control channel transmission from a base station during a configured discovery reference signal window on a shared spectrum; and
transmit synchronization signal block (SSB) at expected SSB positions within a maximum SSB burst length starting from the control channel transmission during the discovery reference signal window.

72. The non-transitory computer-readable medium of clause 71, wherein the control channel transmission is a channel occupancy time system information (COT-SI).

73. The non-transitory computer-readable medium of clause 71 or 72, wherein the maximum SSB burst length is a number of slots equal to half of a configured maximum number of SSBs.

74. The non-transitory computer-readable medium of any of clauses 71-73, wherein the control channel transmission indicates the maximum SSB burst length.

75. The non-transitory computer-readable medium of clause 74, wherein the control channel transmission includes an explicit bit field indicating the maximum SSB burst length.

76. The non-transitory computer-readable medium of clause 75, wherein the code to transmit the SSBs at the expected SSB positions comprises code to transmit the SSBs in a first COT and in a second COT.

77. The non-transitory computer-readable medium of clause 74, wherein the control channel transmission includes a channel occupancy time duration and the maximum SSB burst length is a minimum of the channel occupancy time duration and a number of slots equal to half of a configured maximum number of SSBs.

78. The non-transitory computer-readable medium of clause 77, wherein the code to transmit the SSBs at the expected SSB positions comprises code to transmit the SSBs within the channel occupancy time duration.

79. The non-transitory computer-readable medium of clause 78, wherein the code to transmit the control channel transmission code to perform a listen before talk (LBT) procedure or clear channel assessment (CCA) procedure on the shared spectrum prior to transmitting the control channel transmission.

80. The non-transitory computer-readable medium of any of clauses 71-79, wherein the expected SSB positions consist of a configured number of consecutive SSB positions following the control channel transmission.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising:
receiving, at a user equipment from a base station, a configuration message that indicates a discovery reference signal window including a plurality of synchronization signal block (SSB) positions;
detecting a control channel transmission from the base station on a control channel element (CCE) of a physical downlink control channel (PDCCH) during the configured discovery reference signal window on a shared spectrum; and
measuring synchronization signal blocks (SSBs) at expected SSB positions within a maximum SSB burst length starting from the control channel transmission during the discovery reference signal window.

2. The method of claim 1, wherein the control channel transmission is a channel occupancy time structure indicator (COT-SI).

3. The method of claim 1, wherein the maximum SSB burst length is a number of slots equal to half of a configured maximum number of SSBs.

4. The method of claim 1, wherein measuring the SSBs at the expected SSB positions comprises stopping the measuring after the expected SSB positions.

5. The method of claim 1, wherein measuring the SSBs at the expected SSB positions comprises stopping the measuring at an end of the discovery reference signal window.

6. The method of claim 1, wherein the control channel transmission indicates the maximum SSB burst length.

7. The method of claim 6, wherein the control channel transmission includes an explicit bit field indicating the maximum SSB burst length.

8. The method of claim 6, wherein the control channel transmission includes a channel occupancy time duration, and wherein the maximum SSB burst length is a minimum of the channel occupancy time duration and a number of slots equal to half of a configured maximum number of SSBs.

9. The method of claim 1, further comprising entering a sleep mode after measuring SSBs at the expected SSB positions.

10. The method of claim 1, wherein the expected SSB positions consist of a configured number of consecutive SSB positions following the control channel transmission.

11. A method of wireless communication, comprising:
transmitting, from a base station to a user equipment, a configuration message that indicates a discovery reference signal window including a plurality of synchronization signal block (SSB) positions;

transmitting a control channel transmission on a control channel element (CCE) of a physical downlink control channel (PDCCH) from the base station during the configured discovery reference signal window on a shared spectrum; and transmitting synchronization signal block (SSB) at expected SSB positions within a maximum SSB burst length starting from the control channel transmission during the discovery reference signal window.

12. The method of claim 11, wherein the control channel transmission is a channel occupancy time system information (COT-SI).

13. The method of claim 11, wherein the maximum SSB burst length is a number of slots equal to half of a configured maximum number of SSBs.

14. The method of claim 11, wherein the control channel transmission indicates the maximum SSB burst length.

15. The method of claim 14, wherein the control channel transmission includes an explicit bit field indicating the maximum SSB burst length.

16. The method of claim 15, wherein transmitting the SSBs at the expected SSB positions comprises transmitting the SSBs in a first COT and in a second COT.

17. The method of claim 14, wherein the control channel transmission includes a channel occupancy time duration and the maximum SSB burst length is a minimum of the channel occupancy time duration and a number of slots equal to half of a configured maximum number of SSBs.

18. The method of claim 17, wherein transmitting the SSBs at the expected SSB positions comprises transmitting the SSBs within the channel occupancy time duration.

19. The method of claim 18, wherein transmitting the control channel transmission comprises performing a listen before talk (LBT) procedure or clear channel assessment (CCA) procedure on the shared spectrum prior to transmitting the control channel transmission.

20. The method of claim 11, wherein the expected SSB positions consist of a configured number of consecutive SSB positions following the control channel transmission.

21. An apparatus for wireless communication, comprising:
a memory storing computer-executable instructions; and
at least one processor coupled to the memory and configured to execute the computer-executable instructions to:
receive, at a user equipment from a base station, a configuration message that indicates a discovery reference signal window including a plurality of synchronization signal block (SSB) positions;
detect a control channel transmission on a control channel element (CCE) of a physical downlink control channel (PDCCH) from the base station during the configured discovery reference signal window on a shared spectrum; and
measure synchronization signal blocks (SSBs) at expected SSB positions within a maximum SSB burst length starting from the control channel transmission during the discovery reference signal window.

22. The apparatus of claim 21, wherein the control channel transmission is a channel occupancy time structure indicator (COT-SI).

23. The apparatus of claim 21, wherein the maximum SSB burst length is a number of slots equal to half of a configured maximum number of SSBs.

24. The apparatus of claim 21, wherein the at least one processor is configured to stop the measuring after the expected SSB positions.

25. The apparatus of claim 21, wherein the at least one processor is configured to stop the measuring at an end of the discovery reference signal window.

26. The apparatus of claim 21, wherein the control channel transmission indicates the maximum SSB burst length.

27. The apparatus of claim 26, wherein the control channel transmission includes an explicit bit field indicating the maximum SSB burst length.

28. The apparatus of claim 26, wherein the control channel transmission includes a channel occupancy time duration, and wherein the maximum SSB burst length is a minimum of the channel occupancy time duration and a number of slots equal to half of a configured maximum number of SSBs.

29. The apparatus of claim 21, wherein the at least one processor is configured to enter a sleep mode after measuring SSBs at the expected SSB positions.

30. An apparatus for wireless communication, comprising:
a memory storing computer-executable instructions, and
at least one processor coupled to the memory and configured to execute the computer-executable instructions to:
transmit, from a base station to a user equipment, a configuration message that indicates a discovery reference signal window including a plurality of synchronization signal block (SSB) positions;
transmit a control channel transmission on a control channel element (CCE) of a physical downlink control channel (PDCCH) from the base station during the configured discovery reference signal window on a shared spectrum, and
transmit synchronization signal block (SSB) at expected SSB positions within a maximum SSB burst length starting from the control channel transmission during the discovery reference signal window.

* * * * *